United States Patent
Lo et al.

(10) Patent No.: US 9,454,276 B2
(45) Date of Patent: Sep. 27, 2016

(54) APPARATUS WITH BOTH TOUCH SENSING AND ELECTRICAL FIELD SENSING FUNCTIONS AND INTERACTIVE APPARATUS USING THE SAME

(71) Applicant: Generalplus Technology Inc., Hsinchu (TW)

(72) Inventors: Li Sheng Lo, Zhubei (TW); Tung-Tsai Liao, Hsinchu (TW)

(73) Assignee: GENERALPLUS TECHNOLOGY INC., Hsinchu (TW)

(*) Notice: Subject to any disclaimer, the term of this patent is extended or adjusted under 35 U.S.C. 154(b) by 54 days.

(21) Appl. No.: 14/618,915

(22) Filed: Feb. 10, 2015

(65) Prior Publication Data
US 2015/0293161 A1  Oct. 15, 2015

(30) Foreign Application Priority Data
Apr. 9, 2014  (TW) .............................. 103112939 A (51) Int. Cl.
G06F 3/045 (2006.01)
G06F 3/044 (2006.01)
G01D 5/24 (2006.01)

(52) U.S. Cl.
CPC ................ G06F 3/044 (2013.01); G01D 5/24 (2013.01)

(58) Field of Classification Search
None
See application file for complete search history.

(56) References Cited

U.S. PATENT DOCUMENTS

2009/0021268 A1* 1/2009 Liao .................... H03K 17/962
324/686
2009/0021269 A1* 1/2009 Liao .................... H03K 17/955
324/686

* cited by examiner

*Primary Examiner* — Joseph Haley
*Assistant Examiner* — Ifedayo Iluyomade
(74) *Attorney, Agent, or Firm* — Muncy, Geissler, Olds & Lowe, P.C.

(57) ABSTRACT

An apparatus with both touch sensing and electrical field sensing functions and an interactive apparatus using the same are provided. The apparatus with both touch sensing and electrical field sensing functions comprises a control circuit, a first capacitive sensing electrode and a second capacitive sensing electrode. The first capacitive sensing electrode is coupled to a first sensing control terminal of the control circuit. The second capacitive sensing electrode is coupled to a second sensing control terminal of the control circuit. In a first period, the first capacitive sensing electrode is charged to a first voltage through the first sensing control terminal, and the second sensing control terminal supplies an electrical field pulse to the second capacitive sensing electrode such that the second capacitive sensing electrode outputs an electrical field pulse signal. In the first period, the control circuit determines whether the first capacitive sensing electrode is touched or not according to a period, during which a voltage of the first capacitive sensing electrode is discharged from the first voltage to a second voltage, and determines whether the second capacitive sensing electrode approximates the first capacitive sensing electrode or not according to whether the first capacitive sensing electrode synchronously detects the electrical field pulse or not.

9 Claims, 5 Drawing Sheets

APPARATUS WITH BOTH TOUCH SENSING AND ELECTRICAL FIELD SENSING FUNCTIONS AND INTERACTIVE APPARATUS USING THE SAME

This application claims priority of No. 103112939 filed in Taiwan R.O.C. on Apr. 9, 2014 under 35 USC 119, the entire content of which is hereby incorporated by reference.

BACKGROUND OF THE INVENTION

1. Field of the Invention

The present invention relates to the proximity sensing technology, and more particularly to an apparatus with both touch sensing and electrical field sensing functions and an interactive apparatus using the same.

2. Related Art

Figure 1:
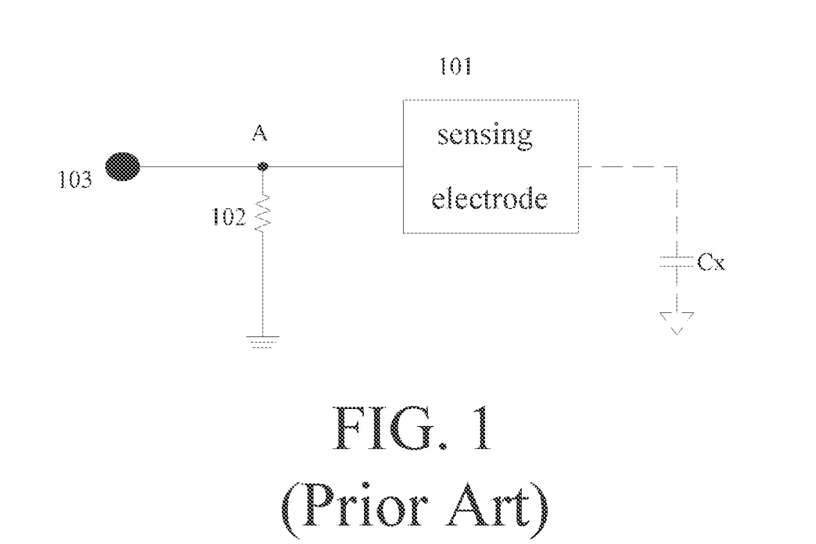
FIG. 1 is a circuit diagram of a conventional touch (capacitive) sensor.

Recently, due to advances in technology, many control buttons, such as the buttons of an elevator or the buttons of an electronic game console, have been modified from the conventional mechanical spring buttons to the touch sensors. FIG. 1 is a circuit diagram of a conventional touch (capacitive) sensor. Referring to FIG. 1, this circuit comprises a sensing electrode 101, a resistor 102 and a sensing control terminal 103. In this circuit, the sensing electrode 101 is equivalent to a grounded capacitor Cx.

Figure 2:
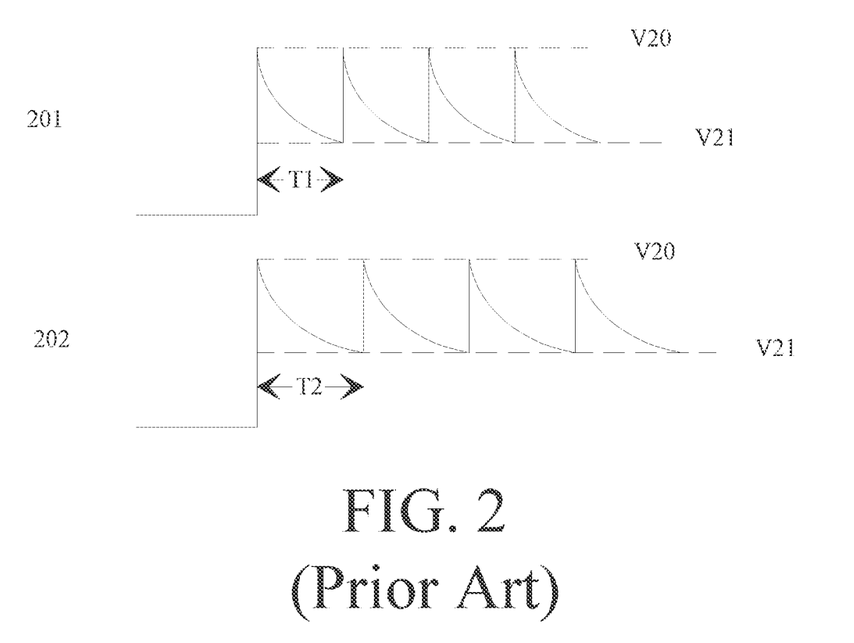
FIG. 2 shows operation waveforms of a conventional capacitive sensor at a coupling node A between the sensing electrode 101 and the resistor 102.

FIG. 2 shows operation waveforms of a conventional capacitive sensor at a coupling node A between the sensing electrode 101 and the resistor 102. Referring to FIGS. 1 and 2, after the sensing control terminal 103 starts to charge the node A to a first rated voltage V20 and keeps the node A in a high impedance state, the sensing electrode 101 starts to discharge through the resistor 102 because the sensing electrode 101 is equivalent to a grounded capacitor Cx. The sensing control terminal 103 continuously detects the voltage of the node A. When the voltage of the node A is discharged to a second rated voltage V21, the sensing control terminal 103 determines whether a finger touches the sensing electrode 101 or not according to a period, during which the node A is discharged from the first rated voltage V20 to the second rated voltage V21, and again charges the node A.

Referring again to FIG. 2, the waveform 201 is the waveform at the node A when the finger does not touch the sensing electrode 101, while the waveform 202 is the waveform at the node A after the finger touches the sensing electrode 101. According to the waveform chart, when the finger touches the sensing electrode 101, the equivalent capacitance of the capacitor Cx of the sensing electrode 101 is increased, so the discharge period T2 of the waveform 202 is longer than the discharge period T1 of the waveform 201. Thus, as long as the sensing control terminal 103 determines that the period, during which the node A is discharged to the second rated voltage V21, is longer than T1, the sensing electrode 101 can be determined as being touched.

Under the condition that the touch sensors are popularized, many plush toys interacts with the human according to the installation of the touch sensor. However, this interaction is only limited to the interaction from the human to the toy. Regarding the toy's self touch sensing, such as that the toy can sense the behavior, such as clapping, belly touching or the like, the existing art needs to add a micro switch, an infrared sensor (IR sensor) or a gravity sensor (G sensor) to the toy. In other words, the additional circuit or element is necessary. If the sensing capability of the touch sensor is to be enhanced, both conditions cannot be properly satisfied because the capacitance difference between the toy's capacitor and the human body is extremely large. Thus, the sensing tends to be induced by the inadvertently touch of the human body, and the problem of the poor self-sensing also occurs.

SUMMARY OF THE INVENTION

An object of the present invention is to provide an apparatus with both touch sensing and electrical field sensing functions and an interactive apparatus using the same, so that the both the touch sensing and self-emitting electrical field sensing can be possessed without increasing the additional costs and elements.

In view of this, the present invention provides an apparatus with both touch sensing and electrical field sensing functions. The apparatus with both touch sensing and electrical field sensing functions comprises a control circuit, a first capacitive sensing electrode and a second capacitive sensing electrode. The control circuit has a first sensing control terminal and a second sensing control terminal. The first capacitive sensing electrode is coupled to the first sensing control terminal. The second capacitive sensing electrode is coupled to the second sensing control terminal. In a first period, the second capacitive sensing electrode is charged to a first voltage through the second sensing control terminal. In the first period, the first sensing control terminal supplies an electrical field pulse to first capacitive sensing electrode such that the first capacitive sensing electrode outputs an electrical field pulse signal. In the first period, the control circuit determines whether the second capacitive sensing electrode synchronously detects the electrical field pulse, and the control circuit determines a period, during which a voltage of the second capacitive sensing electrode is discharged from the first voltage to a second voltage, to determine whether the second capacitive sensing electrode is touched or not.

In a second period, the first capacitive sensing electrode is charged to the first voltage through the first sensing control terminal. In the second period, the second sensing control terminal supplies an electrical field pulse to the second capacitive sensing electrode such that the second capacitive sensing electrode outputs an electrical field pulse signal. In the second period, the control circuit determines whether the first capacitive sensing electrode synchronously detects the electrical field pulse, and the control circuit determines a period, during which the voltage of the first capacitive sensing electrode is discharged from the first voltage to a second voltage to determine whether the first capacitive sensing electrode is touched or not.

The present invention provides an interactive apparatus. The interactive apparatus comprises a control circuit, a first capacitive sensing electrode, a second capacitive sensing electrode and an interactive behavior generating apparatus. The control circuit comprises a first sensing control terminal and a second sensing control terminal. The first capacitive sensing electrode is coupled to the first sensing control terminal and disposed at a first position of the interactive apparatus. The second capacitive sensing electrode is coupled to the second sensing control terminal and disposed at a second position of the interactive apparatus. The interactive behavior generating apparatus is coupled to the control circuit and generates at least one interactive behavior. In a first period, the second capacitive sensing electrode is charged to a first voltage through the second sensing control terminal. In the first period, the first sensing control terminal supplies an electrical field pulse to the first capacitive sensing electrode such that the first capacitive sensing electrode outputs an electrical field pulse signal. In the first period, the control circuit determines whether the second capacitive sensing electrode synchronously detects the electrical field pulse or not to determine whether the first capacitive sensing electrode approximates the second capacitive sensing electrode or not, and the control circuit determines a period, during which a voltage of the second capacitive sensing electrode is discharged from the first voltage to a second voltage, to determine whether the second capacitive sensing electrode is touched or not. In the first period, the control circuit detects the electrical field pulse from the second sensing control terminal, and the control circuit controls the interactive behavior generating apparatus to generate a first interactive behavior. In the first period, the control circuit determines that the second capacitive sensing electrode is touched from the second sensing control terminal, and the control circuit controls the interactive behavior generating apparatus to generate a second interactive behavior.

In a second period, the first capacitive sensing electrode is charged to the first voltage through the first sensing control terminal. In the second period, the second sensing control terminal supplies the electrical field pulse to the second capacitive sensing electrode such that the second capacitive sensing electrode outputs the electrical field pulse signal. In the second period, the control circuit determines whether the first capacitive sensing electrode synchronously detects the electrical field pulse or not to determine whether the second capacitive sensing electrode approximates the first capacitive sensing electrode or not, and the control circuit determines a period, during which a voltage of the first capacitive sensing electrode is discharged from the first voltage to the second voltage, to determine whether the first capacitive sensing electrode is touched or not. In the second period, the control circuit detects the electrical field pulse from the first sensing control terminal, and the control circuit controls the interactive behavior generating apparatus to generate a third interactive behavior. In the second period, the control circuit determines that the first capacitive sensing electrode is touched from the first sensing control terminal, and the control circuit controls the interactive behavior generating apparatus to generate a fourth interactive behavior.

According to the interactive apparatus and the apparatus with both touch sensing and electrical field sensing functions in a preferred embodiment of the present invention, the control circuit further comprises a third sensing control terminal, and the apparatus with both touch sensing and electrical field sensing functions further comprises a third capacitive sensing electrode. The third capacitive sensing electrode is coupled to the third sensing control terminal. In a third period, the first capacitive sensing electrode is charged to the first voltage through the first sensing control terminal, and the second capacitive sensing electrode is charged to the first voltage through the second sensing control terminal. In the third period, the third sensing control terminal supplies the electrical field pulse to the third capacitive sensing electrode such that the third capacitive sensing electrode outputs the electrical field pulse signal. In the third period, the control circuit determines whether the first capacitive sensing electrode and the second capacitive sensing electrode synchronously detect the electrical field pulse or not. The control circuit determines a period, during which a voltage of the first capacitive sensing electrode is discharged from the first voltage to the second voltage, to determine whether the first capacitive sensing electrode is touched or not. The control circuit determines a period, during which the voltage of the second capacitive sensing electrode is discharged from the first voltage to the second voltage, to determine whether the second capacitive sensing electrode is touched or not.

In the third period, the control circuit detects the electrical field pulse from the first sensing control terminal, and the control circuit controls the interactive behavior generating apparatus to generate a fifth interactive behavior. In the third period, the control circuit detects the electrical field pulse from the second sensing control terminal, and the control circuit controls the interactive behavior generating apparatus to generate a sixth interactive behavior. In the third period, the control circuit determines that the first capacitive sensing electrode is touched, and the control circuit controls the interactive behavior generating apparatus to generate a seventh interactive behavior. In the third period, the control circuit determines that the second capacitive sensing electrode is touched, and the control circuit controls the interactive behavior generating apparatus to generate an eighth interactive behavior.

In the first period, the third capacitive sensing electrode is charged to the first voltage through the third sensing control terminal. In the first period, the control circuit determines whether the third capacitive sensing electrode synchronously detects the electrical field pulse or not to determine whether the first capacitive sensing electrode approximates the third capacitive sensing electrode or not, and the control circuit determines a period, during which a voltage of the third capacitive sensing electrode is discharged from the first voltage to the second voltage, to determine whether the third capacitive sensing electrode is touched or not. In the first period, the control circuit detects the electrical field pulse from the third sensing control terminal, and the control circuit controls the interactive behavior generating apparatus to generate a ninth interactive behavior. In the first period, the control circuit determines that third capacitive sensing electrode is touched, and the control circuit controls the interactive behavior generating apparatus to generate a tenth interactive behavior.

In the second period, the third capacitive sensing electrode is charged to the first voltage through the third sensing control terminal. In the second period, the control circuit determines whether the third capacitive sensing electrode synchronously detects the electrical field pulse or not to determine whether the second capacitive sensing electrode approximates the third capacitive sensing electrode or not, and the control circuit determines a period, during which the voltage of the third capacitive sensing electrode is discharged from the first voltage to the second voltage, to determine whether the third capacitive sensing electrode is touched or not. In the second period, the control circuit detects the electrical field pulse from the third sensing control terminal, and the control circuit controls the interactive behavior generating apparatus to generate an eleventh interactive behavior. In the second period, the control circuit determines that third capacitive sensing electrode is touched, and the control circuit controls the interactive behavior generating apparatus to generate a twelfth interactive behavior.

The spirit of the present invention is to provide the low-cost touch sensing and electrical field sensing technology capable of achieving the human body touch interaction and toy's self touch sensing concurrently without increasing the additional circuit costs. In the prior art, if the toy's self touch sensing functions need to be increased, the sensing elements need to be increased, so that the number of the connection ports of the controller as well as the product size and weight have to be increased. Thus, the present invention can decrease the additional element costs and also can reduce the loading of the controller and the product weight and size.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 3:
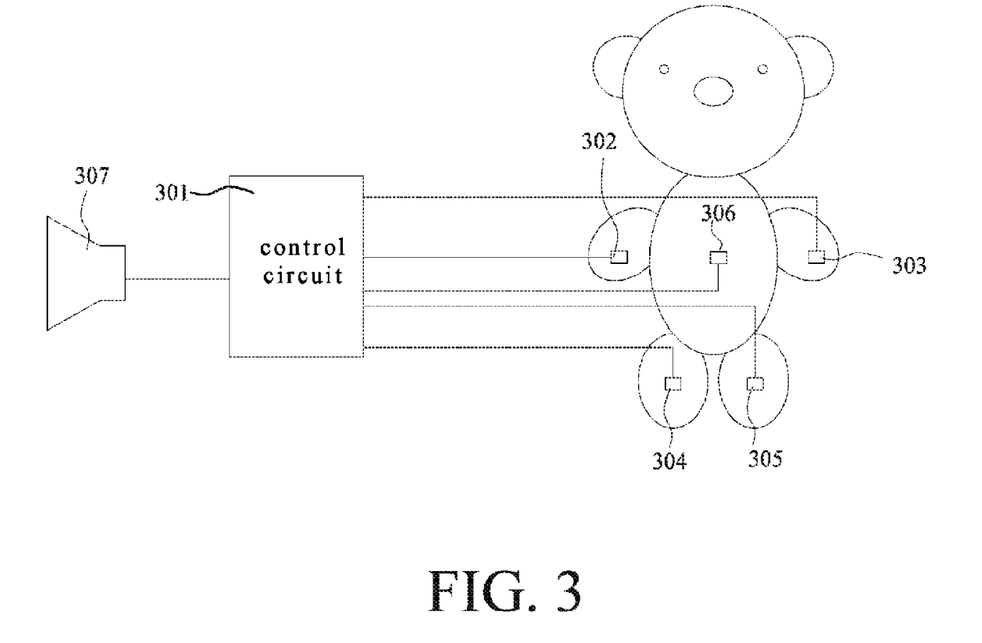
FIG. 3 is a system block diagram showing an apparatus with both touch sensing and electrical field sensing functions according to a preferred embodiment of the present invention, and an interactive apparatus using the same.

FIG. 3 is a system block diagram showing an apparatus with both touch sensing and electrical field sensing functions according to a preferred embodiment of the present invention, and an interactive apparatus using the same. Referring to FIG. 3, the interactive apparatus of this embodiment is a model of a bear doll serving as an example. This apparatus with both touch sensing and electrical field sensing functions comprises a control circuit 301, a first capacitive sensing electrode 302, a second capacitive sensing electrode 303, a third capacitive sensing electrode 304, a fourth capacitive sensing electrode 305 and a fifth capacitive sensing electrode 306. The interactive system comprises the apparatus with both touch sensing and electrical field sensing functions, and further comprises an interactive behavior generating apparatus 307. In this embodiment, a speaker serves as an example of the interactive behavior generating apparatus 307. The first capacitive sensing electrode 302 is coupled to the first sensing control terminal of the control circuit 301. The second capacitive sensing electrode 303 is coupled to the second sensing control terminal of the control circuit 301. The third capacitive sensing electrode 304 is coupled to the third sensing control terminal of the control circuit 301. The fourth capacitive sensing electrode 305 is coupled to the fourth sensing control terminal of the control circuit 301. The fifth capacitive sensing electrode 306 is coupled to the fifth sensing control terminal of the control circuit 301.

Figure 4:
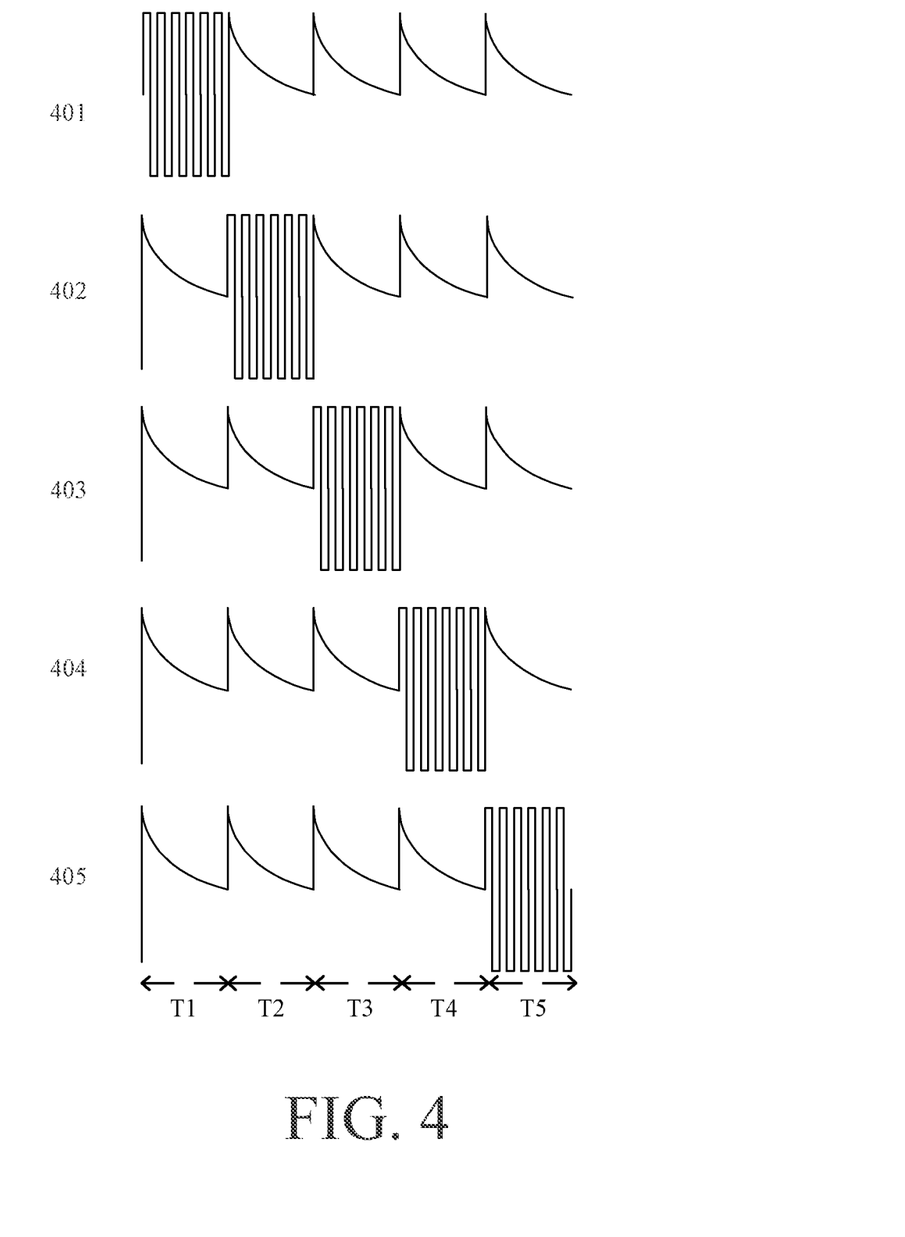
FIG. 4 shows timing charts of an apparatus with both touch sensing and electrical field sensing functions and an interactive apparatus using the same according to a preferred embodiment of the present invention.

FIG. 4 shows timing charts of an apparatus with both touch sensing and electrical field sensing functions and an interactive apparatus using the same according to a preferred embodiment of the present invention. Referring to FIG. 3 and FIG. 4, symbol 401 represents the signal outputted from the first sensing control terminal of the control circuit 301; symbol 402 represents the signal outputted from the second sensing control terminal of the control circuit 301; symbol 403 represents the signal outputted from the third sensing control terminal of the control circuit 301; symbol 404 represents the signal outputted from the fourth sensing control terminal of the control circuit 301; and symbol 405 represents the signal outputted from the fifth sensing control terminal of the control circuit 301.

In the first period T1, the control circuit 301 charges the second capacitive sensing electrode 303, the third capacitive sensing electrode 304, the fourth capacitive sensing electrode 305 and the fifth capacitive sensing electrode 306 through the second sensing control terminal, the third sensing control terminal, the fourth sensing control terminal and the fifth sensing control terminal, respectively. Then, the control circuit 301 calculates the period, during which the second capacitive sensing electrode 303, the third capacitive sensing electrode 304, the fourth capacitive sensing electrode 305 and the fifth capacitive sensing electrode 306 are discharged to the predetermined voltage, through the second sensing control terminal, the third sensing control terminal, the fourth sensing control terminal and the fifth sensing control terminal, respectively, to determine whether the second capacitive sensing electrode 303, the third capacitive sensing electrode 304, the fourth capacitive sensing electrode 305 and the fifth capacitive sensing electrode 306 are touched or not. In addition, in the first period T1, the control circuit 301 outputs an electrical field pulse to the first capacitive sensing electrode 302 through the first sensing control terminal.

Similarly, in the second period T2, the control circuit 301 charges the first capacitive sensing electrode 302, the third capacitive sensing electrode 304, the fourth capacitive sensing electrode 305 and the fifth capacitive sensing electrode 306 through the first sensing control terminal, the third sensing control terminal, the fourth sensing control terminal and the fifth sensing control terminal, respectively. Thereafter, the control circuit 301 calculates the period, during which the first capacitive sensing electrode 302, the third capacitive sensing electrode 304, the fourth capacitive sensing electrode 305 and the fifth capacitive sensing electrode 306 are discharged to the predetermined voltage through the first sensing control terminal, the third sensing control terminal, the fourth sensing control terminal and the fifth sensing control terminal, respectively, to determine whether the first capacitive sensing electrode 302, the third capacitive sensing electrode 304, the fourth capacitive sensing electrode 305 and the fifth capacitive sensing electrode 306 are touched or not. In addition, in the second period T2, the control circuit 301 outputs the electrical field pulse to the second capacitive sensing electrode 303 through the second sensing control terminal. The operations in the third period T3, the fourth period T4 and the fifth period T5 may be easily analogized by those skilled in the art according to the operation mode, and detailed descriptions thereof will be omitted.

Figure 5:
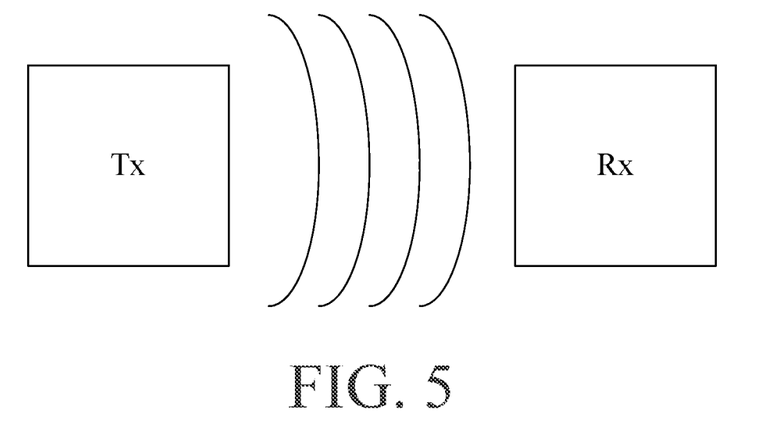
FIG. 5 is a schematic view showing electrical field sensing according to the embodiment of the present invention.
Figure 6:
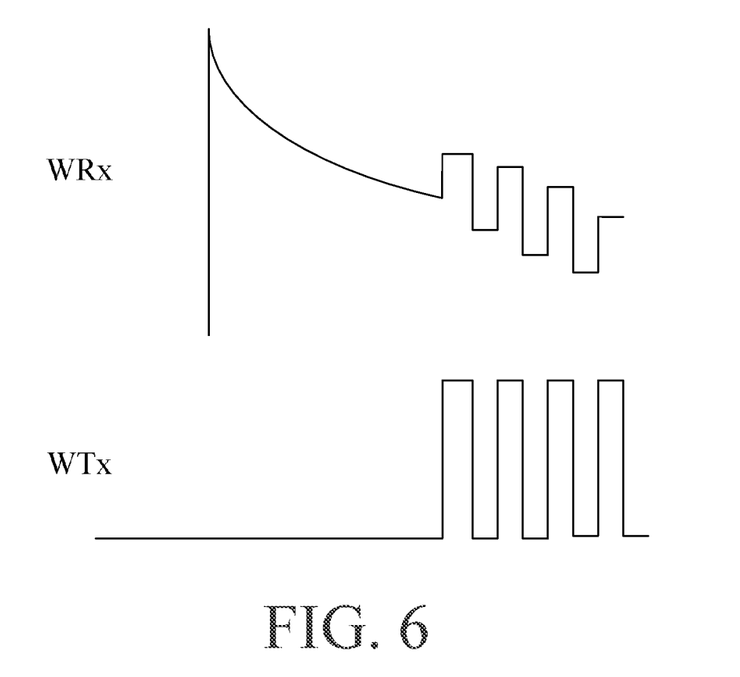
FIG. 6 shows electrical field sensing waveforms according to the embodiment of the present invention.

FIG. 5 is a schematic view showing electrical field sensing according to the embodiment of the present invention. FIG. 6 shows electrical field sensing waveforms according to the embodiment of the present invention. Referring to FIGS. 5 and 6, symbol Rx represents the receiving end, and symbol Tx represents the transmitting end. In addition, WRx represents the waveform of the receiving end, and WTx represents the waveform of the transmitting end. In this embodiment, in order to make those skilled in the art understand the present invention, the transmitting end Tx is the first capacitive sensing electrode 302, and the receiving end Rx is the second capacitive sensing electrode 303, for example. In the first period T1, the first capacitive sensing electrode 302 receives the electrical field pulse, and thus emits the electrical field pulse signal. At this time, if the user moves the left hand of the bear doll of FIG. 3 toward the right hand such that the first capacitive sensing electrode 302 sufficiently approximates the second capacitive sensing electrode 303, the waveform of the second capacitive sensing electrode is shown by the waveform WRx of FIG. 6, and the electrical field pulse is synchronously received. When the control circuit 301 receives the electrical field pulse through the second sensing control terminal, and the received electrical field pulse is synchronous with the electrical field pulse emitted from the first capacitive sensing electrode 302, the control circuit 301 can determine that the distance between the first capacitive sensing electrode 302 and the second capacitive sensing electrode 303 is shortened by the user. At this time, the control circuit 301 controls the interactive behavior generating apparatus 307 to output the clapping sound in response to the user's operation on the interactive apparatus.

Similarly, it is assumed that the transmitting end Tx is the third capacitive sensing electrode 304, and the receiving end Rx is the second capacitive sensing electrode 303. In the third period T3, the third capacitive sensing electrode 304 receives the electrical field pulse, and thus emits the electrical field pulse signal. If the user moves the right hand of the bear doll of FIG. 3 toward the belly at this time so that the second capacitive sensing electrode 303 sufficiently approximates the third capacitive sensing electrode 304, then the waveform of the second capacitive sensing electrode 303 is shown in FIG. 6, and the electrical field pulse is synchronously received. When the control circuit 301 receives the electrical field pulse through the second sensing control terminal, and the received electrical field pulse is synchronous with the electrical field pulse emitted form the third capacitive sensing electrode 304, the control circuit 301 can determine that the distance between the second capacitive sensing electrode 303 and the third capacitive sensing electrode 304 are shortened by the user. At this time, the control circuit 301 controls the interactive behavior generating apparatus 307 to output the Naha laughter in response to the user's operation on the interactive apparatus.

It can be obtained from the above-mentioned embodiments that the embodiment of the present invention changes the control method while achieving the touch sensing and electrical field sensing functions under the architecture of the original circuit. In addition, although the implementation of the interactive behavior generating apparatus 307 of the embodiment is based on the speaker as an example, those skilled in the art should understand that he interactive behavior generating apparatus 307 can have different interactions according to different designs. For example, the interactive behavior generating apparatus 307 may include a small motor working in conjunction with mechanical driving. When the user operates the interactive apparatus, the action interaction can be implemented. Also, the interactive behavior generating apparatus 307 may have a liquid crystal display (LCD) apparatus disposed on the eye of the doll. When the user operates the interactive apparatus, the eye's expression motion interaction displayed on the LCD apparatus can be implemented.

Furthermore, only the clapping sound interaction, generated by the proximity between the first capacitive sensing electrode 302 and the second capacitive sensing electrode 303, and the interaction, generated by the proximity between the second capacitive sensing electrode 303 and the third capacitive sensing electrode 304, are described in the embodiment. However, those skilled in the art should know that the control method of the interactive apparatus comprises the touches on the first capacitive sensing electrode 302, the second capacitive sensing electrode 303, the third capacitive sensing electrode 304, the fourth capacitive sensing electrode 305 and the fifth capacitive sensing electrode 306, the proximity of the first capacitive sensing electrode 302 to the second capacitive sensing electrode 303, the proximity of the first capacitive sensing electrode 302 to the third capacitive sensing electrode 304, the proximity of the first capacitive sensing electrode 302 to the fourth capacitive sensing electrode 305, the proximity of the first capacitive sensing electrode 302 to the fifth capacitive sensing electrode 306, the proximity of the second capacitive sensing electrode 303 to the third capacitive sensing electrode 304, the proximity of the second capacitive sensing electrode 303 to the fourth capacitive sensing electrode 305, the proximity of the second capacitive sensing electrode 303 to the fifth capacitive sensing electrode 306, the proximity of the third capacitive sensing electrode 304 to the fourth capacitive sensing electrode 305, the proximity of the third capacitive sensing electrode 304 to the fifth capacitive sensing electrode 306 and the proximity of the fourth capacitive sensing electrode 305 to the fifth capacitive sensing electrode 306.

Therefore, the capacitive sensing electrodes 302 to 306 of the interactive apparatus can generate at most fifteen different interactions. The interactive behaviors generated by the different interactions may be designed to be completely different, all the same or partially the same. In addition, the interactive behaviors generated by the same interaction may be different. For example, when the capacitive sensing electrode 302 approximates the second capacitive sensing electrode 303, the interactive apparatus sometimes generates the "clapping" interactive behavior, and sometimes generates the "waving" interactive behavior.

These interactive behaviors may be designed to include audio, video or action or the combination of the audio and/or video and/or action. For example, when the user touches the first capacitive sensing electrode 302, the interactive apparatus can control the right hand of the doll to perform the hand shaking action, output the "hand shaking" sound, and change the eye's expression through the LCD disposed on the eye.

Figure 7:
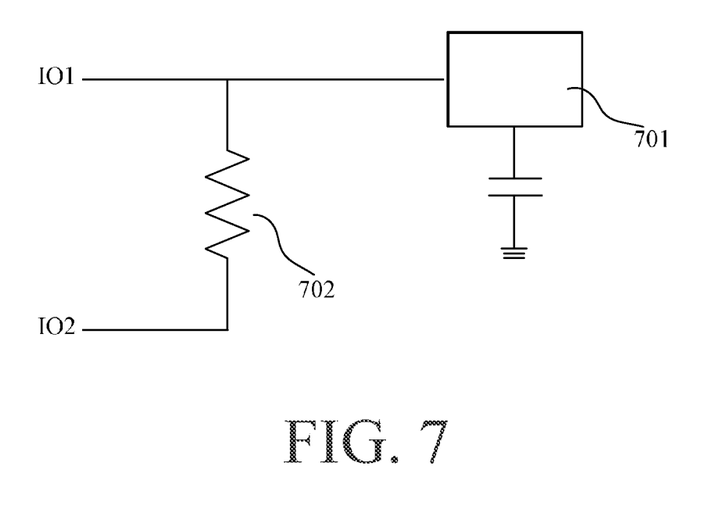
FIG. 7 is a circuit diagram showing a capacitive sensing electrode in an apparatus with both touch sensing and electrical field sensing functions and an interactive apparatus using the same according to a preferred embodiment of the present invention.
Figure 8:
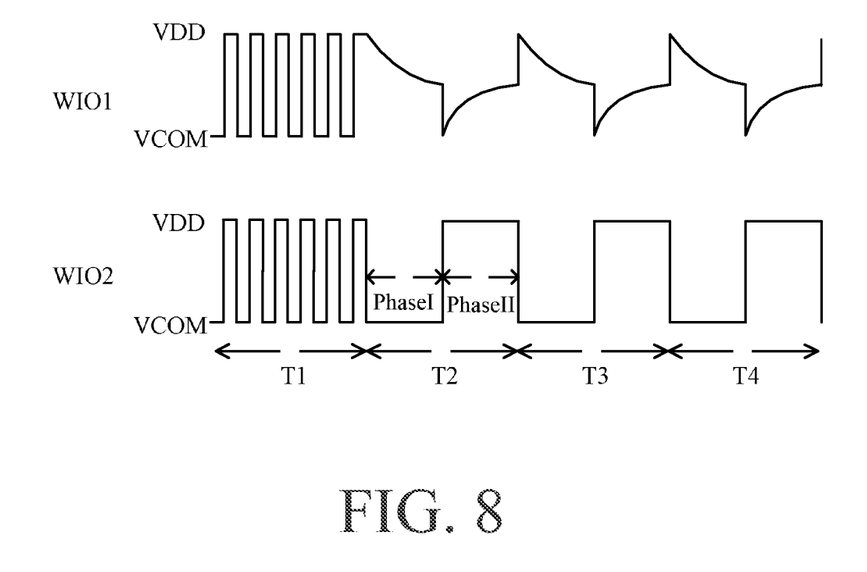
FIG. 8 shows waveforms of a capacitive sensing electrode in an apparatus with both touch sensing and electrical field sensing functions and an interactive apparatus using the same according to a preferred embodiment of the present invention.

FIG. 7 is a circuit diagram showing a capacitive sensing electrode in an apparatus with both touch sensing and electrical field sensing functions and an interactive apparatus using the same according to a preferred embodiment of the present invention. FIG. 8 shows waveforms of a capacitive sensing electrode in an apparatus with both touch sensing and electrical field sensing functions and an interactive apparatus using the same according to a preferred embodiment of the present invention. Referring to FIGS. 7 and 8, in order to further prevent the electrostatic charge from interfering with the capacitance detection, two pins of the control circuit 301 in this embodiment are coupled to the sensing electrode. In order to facilitate the description of the spirit of the present invention, the sensing electrode 701 in this embodiment is the first capacitive sensing electrode 302 serving as an example. The symbol IO1 represents the first sensing control terminal of the control circuit 301; and symbol IO2 represents the first input-output terminal control terminal of the control circuit 301. In addition, this embodiment additionally shows a resistor 702.

The symbol WIO1 represents the output waveform of the first sensing control terminal; and symbol WO2 represents the output waveform of the first input-output terminal control terminal. In the first period T1, the first sensing control terminal IO1 and the first input-output terminal control terminal IO2 concurrently output the electrical field pulse, such that the sensing electrode 701 emits the electrical field signal. Each of the second period T2, the third period T3, the fourth period T4 and the fifth period T5 is divided into two phases. In the first phase PhaseI, the first sensing control terminal IO1 charges the sensing electrode 701 to the first voltage VDD, and the first input-output terminal control terminal IO2 is kept at the common voltage VCOM. The control circuit 301 detects a period, during which the sensing electrode 701 is discharged to a half VDD, through the first sensing control terminal IO1 in the first phase PhaseI. In the second phase PhaseII, the first sensing control terminal IO1 discharges the sensing electrode 701 to the common voltage VCOM, and the first input-output terminal control terminal IO2 is changed from the common voltage VCOM to the first voltage VDD. The control circuit 301 detects the period, during which the sensing electrode 701 is charged to a half VDD, through the first sensing control terminal IO1 in the second phase PhaseII. The control circuit 301 determines whether the sensing electrode 701 is touched or not according to the discharge period of the first phase plus the charge period of the second phase.

When the sensing electrode 701 is either positively charged or negatively charged, the charge/discharge period of the corresponding one of the phases is increased, and the charge/discharge period of the other one of the phases is shortened. In other words, when the sensing electrode 701 is either positively charged or negatively charges, the sum of the charge period and the discharge period is substantially the same as the sum of the charge and discharge periods when the sensing electrode 701 is not charged. Thus, when an object approximates the sensing electrode 701, the control circuit 301 sees the capacitance variation through the first sensing control terminal IO1 as the capacitance of the object approximating the sensing electrode 701 plus the capacitance of the sensing electrode 701. So, when the sensing electrode 701 is either positively charged or negatively charge, the corresponding compensation can be obtained. Thus, various affects caused by the electrostatic charges can be eliminated.

In the above-mentioned embodiment, the first sensing control terminal IO1 and the first input-output terminal control terminal IO2 concurrently output the electrical field pulse as the means for emitting the electrical field signal in the first period T1. However, those skilled in the art should know that when only the first sensing control terminal IO1 outputs the electrical field pulse and the first input-output terminal control terminal IO2 is set in a high impedance state, the sensing electrode 701 still can emit the electrical field pulse. So, the present invention is not restricted thereto. Furthermore, although the embodiment is described with reference to the first capacitive sensing electrode 302 as an example, those skilled in the art should know that the second capacitive sensing electrode 303, the third capacitive sensing electrode 304, the fourth capacitive sensing electrode 305 and the fifth capacitive sensing electrode 306 may be implemented according to the above-mentioned embodiments. So, detailed descriptions thereof will be omitted.

In addition, in the embodiments, although five capacitive sensing electrodes are described as an example, those skilled in the art should know that the number of the capacitive sensing electrodes may be modified according to the product orientation and application. So, the present invention is not restricted thereto. Similarly, the appearance of the interactive apparatus of the embodiment is only for the purpose for describing the spirit of the present invention, and the present invention is not restricted thereto.

In summary, the spirit of the present invention is to provide the low-cost touch sensing and electrical field sensing technology capable of achieving the human body touch interaction and toy's self touch sensing concurrently without increasing the additional circuit costs. In the prior art, if the toy's self touch sensing functions need to be increased, the sensing elements need to be increased, so that the number of the connection ports of the controller as well as the product size and weight have to be increased. Thus, the present invention can decrease the additional element costs and also can reduce the loading of the controller and the product weight and size.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An apparatus with both touch sensing and electrical field sensing functions, the apparatus comprising:
   a control circuit having a first sensing control terminal and a second sensing control terminal;
   a first capacitive sensing electrode coupled to the first sensing control terminal; and
   a second capacitive sensing electrode coupled to the second sensing control terminal;
   wherein in a first period, the second capacitive sensing electrode is charged to a first voltage through the second sensing control terminal;
   wherein in the first period, the first sensing control terminal supplies an electrical field pulse to the first capacitive sensing electrode such that the first capacitive sensing electrode outputs an electrical field pulse signal,
   wherein in the first period, the control circuit determines whether the second capacitive sensing electrode synchronously detects the electrical field pulse or not, and the control circuit determines a period, during which a voltage of the second capacitive sensing electrode is discharged from the first voltage to a second voltage, to determine whether the second capacitive sensing electrode is touched or not;
   wherein in a second period, the first capacitive sensing electrode is charged to the first voltage through the first sensing control terminal;
   wherein in the second period, the second sensing control terminal supplies the electrical field pulse to the second capacitive sensing electrode such that the second capacitive sensing electrode outputs the electrical field pulse signal, wherein in the second period, the control circuit determines whether the first capacitive sensing electrode synchronously detects the electrical field pulse or not, and the control circuit determines a period, during which a voltage of the first capacitive sensing electrode is discharged from the first voltage to the second voltage, to determine whether the first capacitive sensing electrode is touched or not.

2. The apparatus according to claim 1, further comprising:
a first discharge element having a first terminal coupled to the first capacitive sensing electrode;
wherein the control circuit further comprises:
a first input/output control terminal coupled to a second terminal of the first discharge element;
wherein in the second period,
when the first sensing control terminal charges the first capacitive sensing electrode to the first voltage, the first input/output control terminal is set to a first common voltage, and the first sensing control terminal is set to a high impedance,
when a voltage of the first sensing control terminal is discharged from the first voltage to the second voltage, and after the first sensing control terminal is set to the first common voltage, the first sensing control terminal is set to a high impedance, and the first input/output control terminal is set to a second common voltage, and
when the voltage of the first sensing control terminal is charged from the first common voltage to a third voltage, it is determined whether the first capacitive sensing electrode is touched or not according to a period, during which the first capacitive sensing electrode is discharged from the first voltage to the second voltage, plus a period, during which the first capacitive sensing electrode is charged from the first common voltage to the third voltage.

3. The apparatus according to claim 2, further comprising:
a second discharge element having a first terminal coupled to the second capacitive sensing electrode;
wherein the control circuit further comprises:
a second input/output control terminal coupled to a second terminal of the second discharge element;
wherein in the first period,
when the second sensing control terminal charges the second capacitive sensing electrode to the first voltage, the second input/output control terminal is set to the first common voltage, and the first sensing control terminal is set to a high impedance,
when a voltage of the second sensing control terminal is discharged from the first voltage to the second voltage, and after the second sensing control terminal is set to the first common voltage, the second sensing control terminal is set to a high impedance, and the second input/output control terminal is set to the second common voltage, and
when the voltage of the second sensing control terminal is charged from the first common voltage to the third voltage, it is determined whether the second capacitive sensing electrode is touched or not according to a period, during which the second capacitive sensing electrode is discharged from the first voltage to the second voltage, plus a period, during which the second capacitive sensing electrode is charged from the first common voltage to the third voltage.

4. The apparatus according to claim 1, wherein the control circuit further comprises:
a third sensing control terminal, and the apparatus with both touch sensing and electrical field sensing functions further comprises:
a third capacitive sensing electrode coupled to the third sensing control terminal;
wherein in a third period, the first capacitive sensing electrode is charged to the first voltage through the first sensing control terminal, and the second capacitive sensing electrode is charged to the first voltage through the second sensing control terminal;
wherein in the third period, the third sensing control terminal supplies the electrical field pulse to the third capacitive sensing electrode such that the third capacitive sensing electrode outputs the electrical field pulse signal,
wherein in the third period, the control circuit determines whether the first capacitive sensing electrode and the second capacitive sensing electrode synchronously detect the electrical field pulse or not, and the control circuit determines a period, during which a voltage of the first capacitive sensing electrode is discharged from the first voltage to the second voltage, to determine whether the first capacitive sensing electrode is touched or not, and the control circuit determines a period, during which the voltage of the second capacitive sensing electrode is discharged from the first voltage to the second voltage, to determine whether the second capacitive sensing electrode is touched or not;
wherein in the first period, the third capacitive sensing electrode is charged to the first voltage through the third sensing control terminal;
wherein in the first period, the control circuit determines whether the third capacitive sensing electrode synchronously detects the electrical field pulse or not, and the control circuit determines a period, during which the voltage of the third capacitive sensing electrode is discharged from the first voltage to the second voltage, to determine whether the third capacitive sensing electrode is touched or not;
wherein in the second period, the third capacitive sensing electrode is charged to the first voltage through the third sensing control terminal;
wherein in the second period, the control circuit determines whether the third capacitive sensing electrode synchronously detects the electrical field pulse or not, and the control circuit determines a period, during which the voltage of the third capacitive sensing electrode is discharged from the first voltage to the second voltage, to determine whether the third capacitive sensing electrode is touched or not.

5. An interactive apparatus, comprising:
a control circuit having a first sensing control terminal and a second sensing control terminal;
a first capacitive sensing electrode, which is coupled to the first sensing control terminal and disposed at a first position of the interactive apparatus;
a second capacitive sensing electrode, which is coupled to the second sensing control terminal and disposed at a second position of the interactive apparatus; and
an interactive behavior generating apparatus, which is coupled to the control circuit and generates at least one interactive behavior;
wherein in a first period, the second capacitive sensing electrode is charged to a first voltage through the second sensing control terminal;

wherein in the first period, the first sensing control terminal supplies an electrical field pulse to the first capacitive sensing electrode such that the first capacitive sensing electrode outputs an electrical field pulse signal, wherein in the first period, the control circuit determines whether the second capacitive sensing electrode synchronously detects the electrical field pulse or not to determine whether the first capacitive sensing electrode approximates the second capacitive sensing electrode or not, and the control circuit determines a period, during which a voltage of the second capacitive sensing electrode is discharged from the first voltage to a second voltage, to determine whether the second capacitive sensing electrode is touched or not;

wherein in the first period, the control circuit detects the electrical field pulse from the second sensing control terminal, and the control circuit controls the interactive behavior generating apparatus to generate a first interactive behavior;

wherein in the first period, the control circuit determines that the second capacitive sensing electrode is touched from the second sensing control terminal, and the control circuit controls the interactive behavior generating apparatus to generate a second interactive behavior;

wherein in a second period, the first capacitive sensing electrode is charged to the first voltage through the first sensing control terminal;

wherein in the second period, the second sensing control terminal supplies the electrical field pulse to the second capacitive sensing electrode such that the second capacitive sensing electrode outputs the electrical field pulse signal, wherein in the second period, the control circuit determines whether the first capacitive sensing electrode synchronously detects the electrical field pulse or not to determine whether the second capacitive sensing electrode approximates the first capacitive sensing electrode or not, and the control circuit determines a period, during which a voltage of the first capacitive sensing electrode is discharged from the first voltage to the second voltage, to determine whether the first capacitive sensing electrode is touched or not;

wherein in the second period, the control circuit detects the electrical field pulse from the first sensing control terminal, and the control circuit controls the interactive behavior generating apparatus to generate a third interactive behavior;

wherein in the second period, the control circuit determines that the first capacitive sensing electrode is touched from the first sensing control terminal, and the control circuit controls the interactive behavior generating apparatus to generate a fourth interactive behavior.

6. The interactive apparatus according to claim 5, further comprising:
a first discharge element having a first terminal coupled to the first capacitive sensing electrode;
wherein the control circuit further comprises:
a first input/output control terminal coupled to a second terminal of the first discharge element;
wherein in the second period,
when the first sensing control terminal charges the first capacitive sensing electrode to the first voltage, the first input/output control terminal is set to a first common voltage and the first sensing control terminal is set to a high impedance, when a voltage of the first sensing control terminal is discharged from the first voltage to the second voltage, and after the first sensing control terminal is set to the first common voltage, the first sensing control terminal is set to a high impedance, and the first input/output control terminal is set to a second common voltage, and when the voltage of the first sensing control terminal is charged from the first common voltage to a third voltage, it is determined whether the first capacitive sensing electrode is touched or not according to a period, during which the first capacitive sensing electrode is discharged from the first voltage to the second voltage, plus a period, during which the first capacitive sensing electrode is charged from the first common voltage to the third voltage.

7. The interactive apparatus according to claim 6, further comprising:
a second discharge element having a first terminal coupled to the second capacitive sensing electrode;
wherein the control circuit further comprises:
a second input/output control terminal coupled to a second terminal of the second discharge element;
wherein in the first period,
when the second sensing control terminal charges the second capacitive sensing electrode to the first voltage, the second input/output control terminal is set to the first common voltage and the first sensing control terminal is set to a high impedance, when a voltage of the second sensing control terminal is discharged from the first voltage to the second voltage, and after the second sensing control terminal is set to the first common voltage, the second sensing control terminal is set to a high impedance, and the second input/output control terminal is set to the second common voltage, and when the voltage of the second sensing control terminal is charged from the first common voltage to the third voltage, it is determined whether the second capacitive sensing electrode is touched or not according to a period, during which the second capacitive sensing electrode is discharged from the first voltage to the second voltage, plus a period, during which the second capacitive sensing electrode is charged from the first common voltage to the third voltage.

8. The interactive apparatus according to claim 5, wherein the control circuit further comprises:
a third sensing control terminal, and the interactive apparatus further comprises:
a third capacitive sensing electrode, which is coupled to the third sensing control terminal, and disposed at a third position of the interactive apparatus;
wherein in a third period, the first capacitive sensing electrode is charged to the first voltage through the first sensing control terminal, and the second capacitive sensing electrode is charged to the first voltage through the second sensing control terminal;
wherein in the third period, the third sensing control terminal supplies the electrical field pulse to the third capacitive sensing electrode such that the third capacitive sensing electrode outputs the electrical field pulse signal, wherein in the third period, the control circuit determines whether the first capacitive sensing electrode and the second capacitive sensing electrode synchronously detect the electrical field pulse or not, to determine whether the third capacitive sensing electrode approximates the first capacitive sensing electrode or whether the third capacitive sensing electrode approximates the second capacitive sensing electrode, and the control circuit determines a period, during which a voltage of the first capacitive sensing electrode is discharged from the first voltage to the second voltage, to determine whether the first capacitive sensing electrode is touched or not, and the control circuit determines a period, during which the voltage of the second capacitive sensing electrode is discharged from the first voltage to the second voltage, to determine whether the second capacitive sensing electrode is touched or not;

wherein in the third period, the control circuit detects the electrical field pulse from the first sensing control terminal, and the control circuit controls the interactive behavior generating apparatus to generate a fifth interactive behavior;

wherein in the third period, the control circuit detects the electrical field pulse from the second sensing control terminal, and the control circuit controls the interactive behavior generating apparatus to generate a sixth interactive behavior;

wherein in the third period, the control circuit determines that the first capacitive sensing electrode is touched, and the control circuit controls the interactive behavior generating apparatus to generate a seventh interactive behavior;

wherein in the third period, the control circuit determines that the second capacitive sensing electrode is touched, and the control circuit controls the interactive behavior generating apparatus to generate an eighth interactive behavior;

wherein in the first period, the third capacitive sensing electrode is charged to the first voltage through the third sensing control terminal;

wherein in the first period, the control circuit determines whether the third capacitive sensing electrode synchronously detects the electrical field pulse or not to determine whether the first capacitive sensing electrode approximates the third capacitive sensing electrode or not, and the control circuit determines a period, during which a voltage of the third capacitive sensing electrode is discharged from the first voltage to the second voltage, to determine whether the third capacitive sensing electrode is touched or not;

wherein in the first period, the control circuit detects the electrical field pulse from the third sensing control terminal, and the control circuit controls the interactive behavior generating apparatus to generate a ninth interactive behavior;

wherein in the first period, the control circuit determines that third capacitive sensing electrode is touched, and the control circuit controls the interactive behavior generating apparatus to generate a tenth interactive behavior;

wherein in the second period, the third capacitive sensing electrode is charged to the first voltage through the third sensing control terminal;

wherein in the second period, the control circuit determines whether the third capacitive sensing electrode synchronously detects the electrical field pulse or not to determine whether the second capacitive sensing electrode approximates the third capacitive sensing electrode or not, and the control circuit determines a period, during which the voltage of the third capacitive sensing electrode is discharged from the first voltage to the second voltage, to determine whether the third capacitive sensing electrode is touched or not;

wherein in the second period, the control circuit detects the electrical field pulse from the third sensing control terminal, and the control circuit controls the interactive behavior generating apparatus to generate an eleventh interactive behavior;

wherein in the second period, the control circuit determines that third capacitive sensing electrode is touched, and the control circuit controls the interactive behavior generating apparatus to generate a twelfth interactive behavior.

9. The interactive apparatus according to claim 8, wherein each of the first interactive behavior, the second interactive behavior, the third interactive behavior, the fourth interactive behavior, the fifth interactive behavior, the sixth interactive behavior, the seventh interactive behavior, the eighth interactive behavior, the ninth interactive behavior, the tenth interactive behavior, the eleventh interactive behavior and the twelfth interactive behavior is an interaction selected from the group consisting of audio, video and action.

* * * * *